(12) United States Patent
Wachernig et al.

(10) Patent No.: US 10,928,290 B2
(45) Date of Patent: Feb. 23, 2021

(54) DEVICE AND METHOD FOR MEASURING THE CONCENTRATION, SIZE AND ZETA POTENTIAL OF NANOPARTICLES IN LIQUIDS IN SCATTERED LIGHT MODE AND IN FLUORESCENCE MODE

(71) Applicant: PARTICLE METRIX GMBH, Meerbusch (DE)

(72) Inventors: Hanno Wachernig, Dießen a. A. (DE); Margret Boeck, Meerbusch (DE)

(73) Assignee: PARTICLE METRIX GMBH, Meerbusch (DE)

( * ) Notice: Subject to any disclaimer, the term of this patent is extended or adjusted under 35 U.S.C. 154(b) by 0 days.

(21) Appl. No.: 16/347,032

(22) PCT Filed: Nov. 3, 2017

(86) PCT No.: PCT/DE2017/000365
§ 371 (c)(1),
(2) Date: May 2, 2019

(87) PCT Pub. No.: WO2018/082727
PCT Pub. Date: May 11, 2018

(65) Prior Publication Data
US 2019/0277743 A1    Sep. 12, 2019

(30) Foreign Application Priority Data
Nov. 7, 2016 (DE) .................... 10 2016 013 236.1

(51) Int. Cl.
*G01N 15/02* (2006.01)
*G01N 27/447* (2006.01)
(Continued)

(52) U.S. Cl.
CPC ... *G01N 15/0211* (2013.01); *G01N 27/44721* (2013.01); *G01N 2015/0038* (2013.01);
(Continued)

(58) Field of Classification Search
None
See application file for complete search history.

(56) References Cited

U.S. PATENT DOCUMENTS

| 9,939,363 B2 | 4/2018 | Wachernig et al. |
| 2007/0103687 A1 | 5/2007 | Okazaki |

(Continued)

FOREIGN PATENT DOCUMENTS

| DE | 102004042197 | 3/2006 |
| WO | 9945385 | 9/1999 |
| WO | 2011051134 | 5/2011 |

*Primary Examiner* — Shawn Decenzo
(74) *Attorney, Agent, or Firm* — Duane Morris LLP; Gregory M. Lefkowitz

(57) ABSTRACT

The invention relates to a device and method for measuring the concentration, size and zeta potential of nanoparticles in liquids in scattered light mode and fluorescence mode, comprising the following features: a) a sample (28) is irradiated from above by a laser (1) via a beamsplitter (14) and an adjustable-focus liquid lens (9), and the reflected beam of light is deflected by the same beamsplitter (14) and a further liquid lens (8) onto a detector (5), and analysed; b) to observe the fluorescent light, a fluorescence filter (19) is connected in the convergent beam path between the liquid lens (8) and the detector (5), to increase the distance between the scattered light plane (31) and the fluorescence plane (30); and c) to control the measurement process, a particle tracking program, an optical control unit (15) and a display (2) with a touch screen are used.

7 Claims, 3 Drawing Sheets

(51) Int. Cl.
  *G01N 15/00* (2006.01)
  *G01N 15/10* (2006.01)
(52) U.S. Cl.
  CPC ............... *G01N 2015/0053* (2013.01); *G01N 2015/0222* (2013.01); *G01N 2015/1075* (2013.01); *G01N 2015/1087* (2013.01)

(56) References Cited

U.S. PATENT DOCUMENTS

| | | | |
|---|---|---|---|
| 2008/0151227 A1 | 6/2008 | Champ et al. | |
| 2008/0218738 A1* | 9/2008 | Trainer | G01B 11/08 356/72 |
| 2012/0073972 A1* | 3/2012 | Watson | B01L 3/5025 204/549 |
| 2014/0226158 A1* | 8/2014 | Trainer | G01J 3/0218 356/336 |
| 2014/0234865 A1* | 8/2014 | Gabriel | G01N 33/5026 435/7.21 |
| 2016/0320289 A1* | 11/2016 | Tanaka | G01N 15/1459 |
| 2017/0059471 A1* | 3/2017 | Wachemig | G02B 21/06 |
| 2017/0322133 A1* | 11/2017 | Trainer | G01N 15/0211 |
| 2018/0100793 A1* | 4/2018 | Ichiki | G01N 27/26 |
| 2018/0128744 A1* | 5/2018 | Goradia | G01N 21/65 |
| 2020/0033192 A1* | 1/2020 | Calvin | G01J 3/2803 |

* cited by examiner

DEVICE AND METHOD FOR MEASURING THE CONCENTRATION, SIZE AND ZETA POTENTIAL OF NANOPARTICLES IN LIQUIDS IN SCATTERED LIGHT MODE AND IN FLUORESCENCE MODE

CROSS-REFERENCE TO RELATED APPLICATIONS

This application is a § 371 national stage entry of International Application No. PCT/DE2017/000365, filed on Nov. 3, 2017, which claims priority to German Patent Application No. 10 2016 013 236.1, filed on Nov. 7, 2016, the entire contents of which are incorporated herein by reference.

The invention relates to an apparatus and a method for measuring the concentration, the size and the zeta potential of nanoparticles in liquids in the scattered light mode and in the fluorescence mode.

The evaluation can be implemented by PTA (particle tracking analysis; upcoming ISO TS19430) or heterodyne DLS (dynamic light scattering; ISO 22412).

Suspensions and emulsions as disperse substance systems are frequently occurring forms of particles in liquids. The applications reach from printer ink to cosmetic emulsions and pharmaceutical administrations. It is known that disperse systems are classified as thermodynamically unstable systems. The time duration in which such dispersions remain stable is of the utmost importance for applicability. An instability that can be observed very frequently arises by the coagulation of particles, which may lead to irreversible particle size growth or complete separation between liquid phase and particle phase. A number of measures serve to prevent coagulation. One of these is the electrostatic stabilization. Here, use is made of the fact that the approach of particles that are charged in the same sense is made more difficult by the electrostatic repulsion thereof. The repulsion becomes more efficient with increased ionic charge of the particles on their boundaries to the medium.

The electrostatic particle-interface potential, usually referred to as zeta potential, is decisive to this end. This zeta potential is considered to be a measure that determines the degree of repulsion between adjacent particles. Consequently, it has importance in respect of the stability of disperse systems.

There are various physical methods for measuring the zeta potential. Conventional electrophoresis under a microscope, in particular under a scattered light microscope in a 90° arrangement of laser and microscope axis, in the electrophoresis measuring arrangement, is a known method. In the electrophoresis measuring arrangement, the particles are brought into an electric field. The speed of the particles in the applied field increases with increasing zeta potential of the particles. The measured variable is the electrophoretic mobility $\mu_e$, which is nothing other than the measured speed v divided by the applied electric field E. This $\mu_e$ is converted into a zeta potential. This electrophoresis arrangement is popular if the particle electrophoresis movement can be observed directly in the video and, as a result thereof, if possible disturbance effects such as convection can also be identified. The films are automatically evaluated according to the speed distribution of the particles. As a result of the use of sharply focusable lasers, the lower measurement boundary was lowered from a particle size of 1 µm to 0.02 µm. This applies equally to the Brownian motion of the particles, which is observed with the same apparatus and from which the particle size can be derived.

Reference is made to DE 10 2014 007 355 B3 in respect of the prior art. This relates to a method of particle tracking analysis with the aid of scattered light (PTA) and to an apparatus for acquiring and characterizing particles of the order of nanometers in liquids of any type.

In contrast to optical microscopy and electron microscopy, optical scattered light analysis is an indirect measuring method for characterizing the particle size. It is used because particles of less than 1 µm (1000 nm) cannot be observed directly on account of the diffraction limit.

In claim 1 of this document, an apparatus for detecting and characterizing particles of the order of nanometers in liquids of a suspension within a cell wall is claimed, said apparatus having the following features:
  a) a cell wall of rectangular cross section made of black glass with optical windows sintered therein is occupied by an L-shaped heating and cooling element on a longitudinal surface and an adjacent transverse surface, wherein the cell wall rests on a base on the transverse surface, said base being mounted in defined fashion by way of vibration dampeners;
  b) on the transverse surface that lies opposite the transverse surface forming the support of the cell wall, the cell wall is irradiated in the center through an optical glass window by an irradiation device and said cell wall is observed at right angles to the optical axis of the irradiation device through a further optical glass window by an observation device;
  c) the common focus of the irradiation device and the focus of the observation device are displaceable in motor-driven fashion to any point over the spatial inner region of the cell wall by way of a control apparatus;
  d) the surface of the cell wall lying opposite the optical glass window through which radiation from the irradiating device enters has a further optical glass window in the center thereof, with this surface of the cell housing being covered on the outside by a nano carbon layer of equal area;
  e) the surface of the cell wall in which the optical glass window through which the optical axis of the observation device extends is situated is monitored in respect of its temperature by two thermistors.

The invention is based on the object of specifying an apparatus and a method for measuring the concentration, the size and the zeta potential of nanoparticles in liquids in the scattered light mode and in the fluorescence mode.

This object is achieved by apparatus claim 1

An apparatus for measuring the concentration, the size and the zeta potential of nanoparticles in liquids in the scattered light mode and in the fluorescence mode, comprising the following features:
  a) a laser beam (1) is directed through a liquid lens (9) with an adjustable focus and an optical protective glass (23) into a measuring cell (27) with a particle-containing sample (28) from above via a beam splitter (14), wherein the focus of the laser beam (1) is directed to a point below the phase boundary (21) between air and sample liquid,
  b) the light reflected by the sample (28) and the protective glass (23) is partly deflected by the beam splitter (14) and guided to a detector (5) through a further liquid lens (8) with an adjustable focus, wherein a fluorescence filter (10) can be inserted into the beam path between the liquid lens and the detector (5) by means of a displacement device (24), c) a controller (3) having a particle-tracking program or a DLS program (DLS=dynamic light scattering), an optics controller (15) and a display (2) with a touchscreen.

It is moreover claimed that the liquid lens (9) serves the purpose of focusing on the detector (5) and that the viscosity of the sample (28) is ascertained with the aid of a temperature sensor (26) and that the sample vessel (27) contains electrodes (12) for producing electrophoresis and electrodes (13) for measuring the zeta potential.

And by method claim 5

A method for measuring the concentration, the size and the zeta potential of nanoparticles in liquids in the scattered light mode and in the fluorescence mode, including the following features:

a) a sample (28) is irradiated from above by a laser (1) via a beam splitter (14) and a liquid lens (9) with an adjustable focus and the reflected light beam is steered via the same beam splitter (14) and a further liquid lens (8) onto a detector (5) and analyzed, b) a fluorescence filter (19) for increasing the distance between the scattered light plane (31) and the fluorescence plane (30) is inserted into the convergent beam path between the liquid lens (8) and the detector (5) for the purpose of observing the fluorescence light, c) here, a particle tracing program or a heterodyne 180 degrees DLS program, an optics controller (15) and a display (2) with a touchscreen serve to control the measuring process.

and by the viscosity of the sample (28) being ascertained with the aid of a temperature sensor (26). And that the sample vessel (27) contains electrodes (12) for electrophoresis and electrodes (13) for tapping a disturbance-free electric field in order to accurately determine the zeta potential. And a computer program having program code for carrying out the method steps when the program is executed on a computer. And a machine-readable medium having the program code of a computer program for carrying out the method when the program is executed on a computer.

The apparatus according to the invention is described in more detail below.

In detail:

FIG. 1 shows an illustration of the PTA nanoparticle tracking measuring arrangement, proprietary to Particle Metrix.

Figure 1:
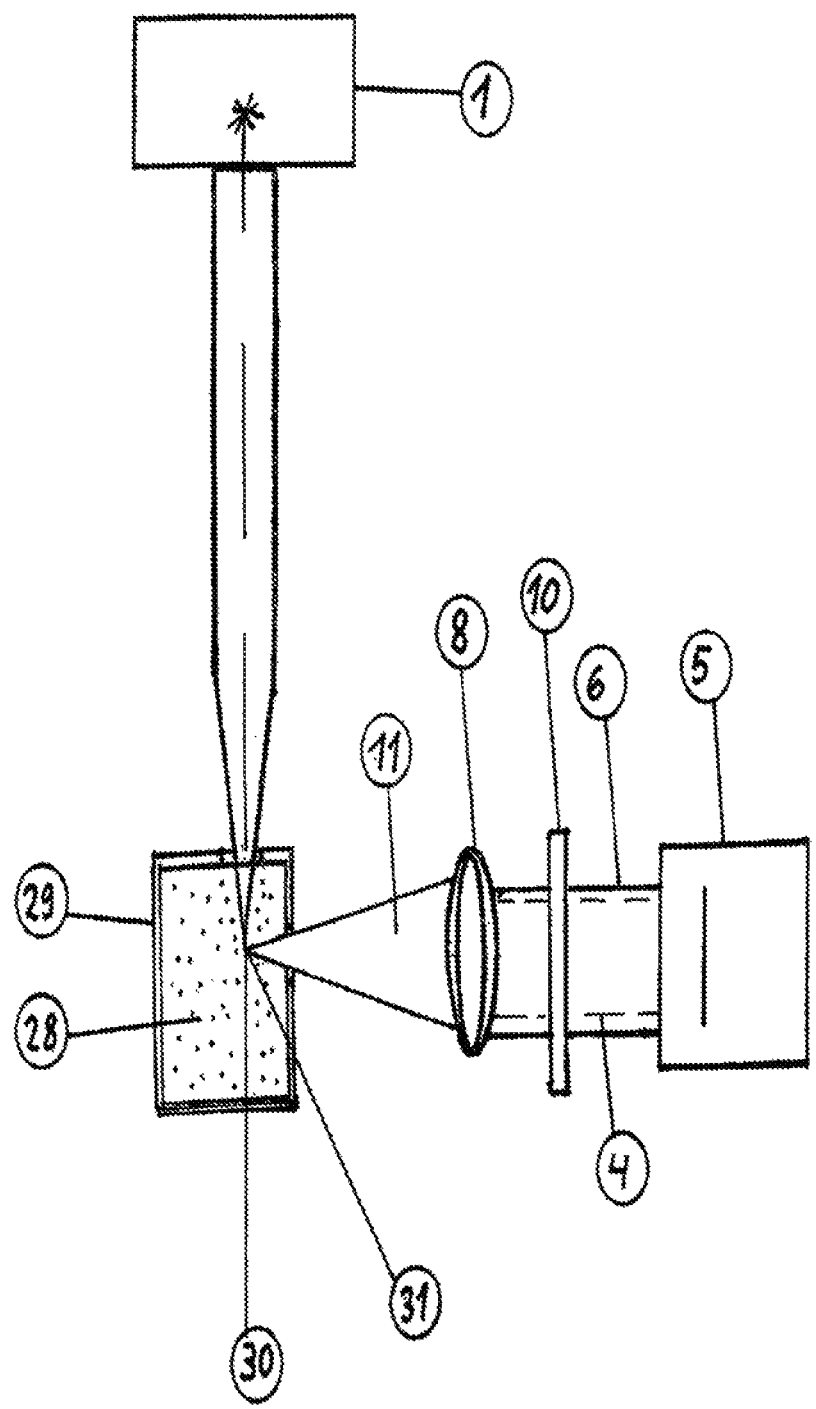
FIG. 1 shows an illustration of a conventional NTA nanoparticle tracking method.

In the PTA, the imaging optical unit consists of the objective lens 6, which is directed on the particulate sample 28 in the measuring cell 29, and a video camera that records the movement of the particles. The laser 1, as an exciting light source for scattered light and fluorescence light, usually radiates in at an angle of 90 degrees thereto. Here, scattered light from the scattered light plane 31 and light from the fluorescence plane 30 are registered simultaneously by the camera 5, or a detector, via the beam path 11 through a liquid lens 8, or a lens 8 that is adjustable in motor-driven fashion, with an adjustable focus after the passage through a fluorescence filter 10 along the beam path 4.

Both scattered light and fluorescence light are emitted simultaneously by the same particles, with the scattered light always having a high intensity. A problem arising herefrom is that the fluorescence light that is weaker by orders of magnitude must be separated from the much stronger scattered light signal by way of an optical edge filter. As a result of the necessary resolution and the high sensitivities, use is made here of black-and-white cameras, or grayscale-value-measuring detectors, which are unable to distinguish between the color of the fluorescence and the color of the scattered light. The filter has the object of blocking scattered light, which originates from the particles, and parasitic stray light, which may strike the detector as a result of an unintended interaction of the laser with the appliance. An increase in the blocking effect of such a filter (LWP=long wave pass) is achieved with an apparatus according to FIG. 2.

Figure 2:
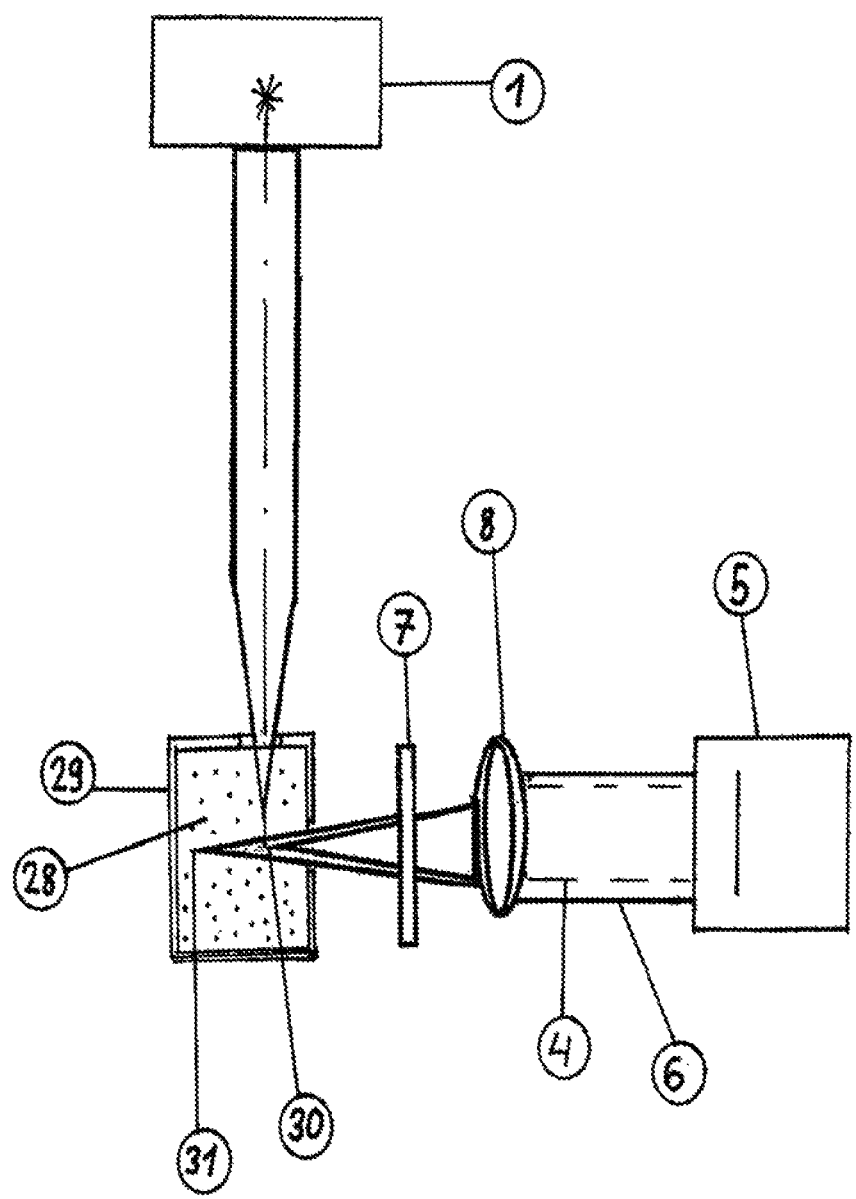
FIG. 2 shows an illustration of an improved version of the method shown in FIG. 1.

FIG. 2 shows an illustration of an improved version of the arrangement shown in FIG. 1. In many parts, this illustration corresponds to the image in FIG. 1. Thus, the imaging optical unit in this case also consists of the objective lens 6, which is directed onto the particulate sample 28 in the measuring cell 29, and a video camera, or a detector, which records the particle. Here, too, the laser 1 is the exciting light source for fluorescence light and scattered light. Here, scattered light from the scattered light plane 31 and light from the fluorescence plane 30 are registered simultaneously at the camera 5 through a liquid lens 8, or a lens 8 that is adjustable in motor-driven fashion, over a beam path not denoted in detail. However, the difference between the two illustrations consists of the fact that the fluorescence filter 7 lies in the convergent beam path between the liquid lens 8, or a lens 8 that is adjustable in motor-driven fashion, and the sample 28, and not in the parallel beam path directly in front of the video camera 5. This is because the attenuation of the filter in many cases is insufficient to completely suppress the scattered light. The described measure improves the situation by orders of magnitude. If the fluorescence filter lies in the convergent beam path between the objective lens and the sample, the focus of the scattered light (e.g., a wavelength of 488 nm) lies behind the focus of the fluorescence light (e.g., a wavelength of 510 nm to 560 nm).

As a result of the dispersion of the refractive properties of the filter there are two foci that are spaced far apart from one another, with the one being assigned to the scattered light and the other being assigned to the reference light. Consequently, the optical unit of the objective lens "looks" either at the scattered light focus or at the fluorescence focus. This leads to suppression of the scattered light by several orders of magnitude if the optical unit is set to the fluorescence. This increases with importance as the fluorescence signals become weaker.

Figure 3:
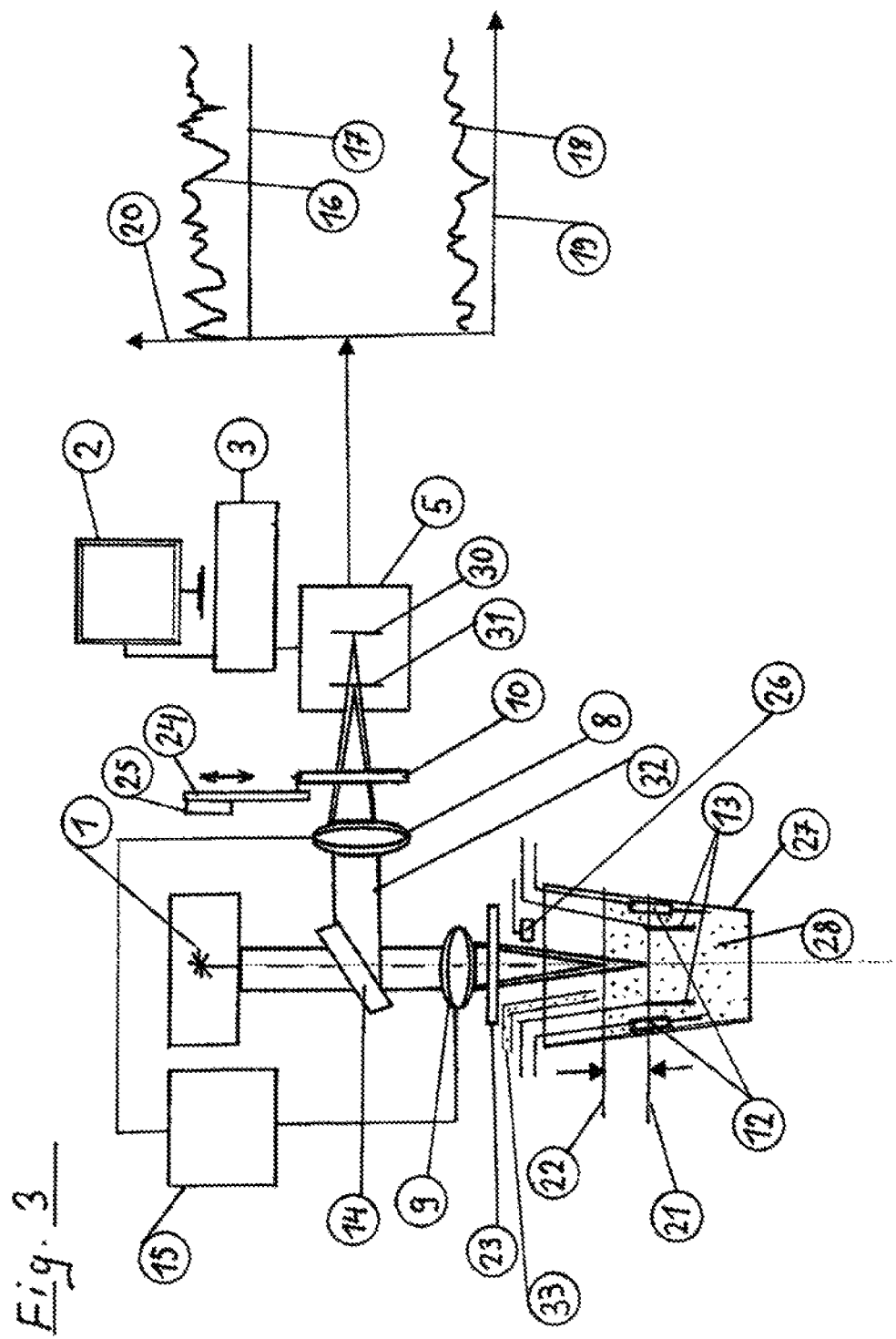
FIG. 3 shows an illustration of an apparatus for measuring the concentration determination and the order of magnitude of nanoparticles in the scattered light mode and in the fluorescence mode.

FIG. 3: shows an illustration of an apparatus for determining the concentration, order of magnitude and zeta potential distribution of nanoparticles in the scattered light mode and in the fluorescence mode.

Like in the preceding illustrations, a laser beam 1 is also directed in the direction of a liquid surface from above in this case, said liquid surface being situated in a container—a sample vessel 27 in this case.

Prior to a measurement, this liquid is homogenized by slight movements. A measurement can start after the liquid has calmed and the container 27 has been opened in the direction of the laser beam 1.

The laser beam 1 directed from above is directed onto the liquid through a liquid lens, or a lens that is moved in motor-driven fashion, 9 with an adjustable focus and an optical protective glass 23 via a beam splitter 14. The protective glass 23 is manufactured from a scratch-proof material, such as sapphire or diamond. The liquid lens 9, or a lens 9 that is adjustable in motor-driven fashion, serves for optimal focusing on a point just below the phase boundary between air and liquid. Here, the focus must lie approximately 0.1 mm to 1 mm within the liquid. The focal length of the liquid lens 9, or a lens 9 that is adjustable in motor-driven fashion, is displaceable in defined fashion by means of an optics controller 15.

The light reflected back by the liquid surface 22 and by the optical protective glass 23 is steered in part onto a detector 5 by the beam splitter 14, wherein a further liquid lens 8, or a lens 8 that is adjustable in motor-driven fashion, serves the purpose of focusing on the detector 5.

The beam splitter 14 is not attached exactly at a 45° angle such that partly reflected laser light that originates from the protective window 23 does not radiate into the emitting laser 1 so as to avoid unwanted feedback effects on the laser.

According to Brownian motion, the nanoparticles situated in the sample 28 scatter in all directions. This movement is transferred onto the scattered light signal as temporal fluctuations. A component of the scattered light corresponding to the solid angle around 180 degrees reaches the detector 5 via the liquid lens 9 and the beam splitter 14. Thus, the light partly reflected at the liquid surface 22, at the liquid lens 9 and at the optical protective glass 23, and also the scattered light from the particles coming from the interior of the sample accumulate on the detector 5.

The mixture of the fluctuating scattered light and the partly reflected laser light on the same detector 5 is referred to as heterodyne-type dynamic light scattering DLS. This mixture is caused by the 180 degrees scattered light arrangement and can be considered to be an optical amplification of the weak scattered light signal by the partly reflected laser.

By way of a so-called baseline measurement, i.e., a measurement with pure liquid without particulate content, it is possible to determine the laser component 17 in the overall signal 16. The information about the concentration and the size distribution of the particles is contained in the scattered light component.

The particle size distribution is calculated from the Brownian molecular motion using the known DLS method. To this end, the viscosity of the sample of the liquid surrounding the particles must be known. This viscosity exists in tabular form for two temperature values for very different liquids. For the purposes of calculating the values going beyond these temperature values, the viscosity is calculable in each case by a person skilled in the art using a simple formula. With the aid of a thermistor, the temperature sensor 26, over the vessel 27, the respective temperature is transmitted to the electronic controller 3 for the purposes of calculating the viscosity.

For the purposes of complementing the determination of the viscose, there is the option of adding reference particles into the sample 28 in metered fashion by means of an addition device 33. Here, these are standard particles with a certain size, for example 100 nm. These particles do not shrink or expand. If there is a change in magnitude during the measurement, this can be used to draw conclusions about the viscosity.

In order to determine the precise penetration depth of the laser beam into the liquid, the liquid lens 9 is set in such a way that the position of the liquid surface is initially determined in accurate fashion by a bright reflection of the laser beam at the liquid surface 22. Proceeding from this position of the liquid lens 9, the latter is set in such a way that the focus comes to rest in the liquid at a precisely determined distance d from the liquid surface. If necessary, the distance d can be optimized for different samples.

The distance d emerges from the difference between 22 and 21.

The imaging lens, the liquid lens 8 in the beam path 32, is imaged with its focus on the detector 5 in the scattered light modus, with the fluorescence filter 10 not being situated in the beam path.

For the purposes of measuring the fluorescing particles, the fluorescence filter is inserted into the beam path in front of the detector 5. As a result of this, the fluorescence focus, or the fluorescence plane 30, is displaced accordingly and readjusted by means of the liquid lens 8. As a result of the different position of the fluorescence focus and the scattered light focus, or the scattered light plane 31, the filter effect is amplified by orders of magnitude, in each case according to the optical design of the imaging optical unit.

The fluorescence filter 10 is removed from the beam path or introduced into the beam path by means of a displacement device 24 and the drive 25 thereof. The difference in the intensities of the respective detector signals 20 between the scattered light component 16 at the signal and the fluorescence signal 18 is plotted over the time axis 19 in the diagrams on the right-hand side of FIG. 3.

The apparatus is operated by means of a touchscreen 2 and a display.

The electrodes installed in the sample vessel 27 are electrophoresis electrodes 12 for a pulsed field or a modulated field, and field-tapping electrodes 13, which serve to measure the effective field in the sample space 28 in order to be able to reliably calculate the zeta potential therefrom. Disturbing effects on the electrodes 12, such as the formation of bubbles, therefore do not contribute to the determination of the electric field.

LIST OF REFERENCE SIGNS

1 Laser
2 Display with touchscreen
3 Controller with particle tracking program
4 Beam path between the liquid lens 8 and the detector 5
5 Detector or video camera
6 Objective lens
7 Fluorescence filter between the liquid lens 8 and the sample 28
8 Liquid lens with an adjustable focus
9 Liquid lens with an adjustable focus (laser)
10 Fluorescence filter between the detector 5 and the lens 8
11 Beam path between the lens 8 and a sample 28
12 Electrophoresis electrodes for a pulsed or modulated field
13 Field-tapping electrodes
14 Beam splitter
15 Optics controller
16 Scattered light component of the signal (SS)
17 Laser component of the signal (LS)
18 Fluorescence signal
19 Time line
20 Detector signal
21 Air/phase boundary between air and liquid (LF)
22 Surface of the sample (liquid surface)
23 Optical protective gas
24 Displacement device for the fluorescence filter 10
25 Drive for the displacement device 24

26 Temperature sensor
27 Sample vessel (Eppendorf tube)
28 Sample
29 Measuring cell
30 Fluorescence plane (FL)
31 Scattered light plane
32 Beam path between the beam splitter 14 and the lens 8
33 Addition device for reagence particles in the case of the viscose measurement

The invention claimed is:

1. An apparatus for measuring the concentration, the size and the zeta potential of nanoparticles in liquids in the scattered light mode and in the fluorescence mode, comprising the following features:
   a liquid lens (9) with an adjustable focus and an optical protective glass (23), a measuring cell (27) with a particle-containing sample (28), a beam splitter (14), wherein a laser beam (1) is directed through the liquid lens and into the measuring cell from above via the beam splitter and the focus of the laser beam is directed to a point below the phase boundary (21) between air and sample liquid,
   a detector (5), a further liquid lens (8) with an adjustable focus, a fluorescence filter (10), and a displacement device (24) wherein the light reflected by the sample and the protective glass is partly deflected by the beam splitter and guided to the detector through the further liquid lens and the fluorescence filter is configured to be inserted into the beam path between the liquid lens and the detector by means of the displacement device, a controller (3) having a particle-tracking program or a DLS program (DLS=dynamic light scattering), an optics controller (15) and a display (2) with a touchscreen.

2. The apparatus as claimed in claim 1, wherein the liquid lens (9) is configured to focus on the detector (5).

3. The apparatus as claimed in claim 1, further comprising a temperature sensor (26), wherein the viscosity of the sample (28) is ascertained with the aid of the temperature sensor.

4. The apparatus as claimed in claim 1, wherein the sample vessel (27) further comprises electrodes (12) configured to produce electrophoresis and electrodes (13) configured to measure the zeta potential.

5. A method for measuring the concentration, the size and the zeta potential of nanoparticles in liquids in the scattered light mode and in the fluorescence mode, including the following features:
   a) a sample (28) is irradiated from above by a laser (1) via a beam splitter (14) and a liquid lens (9) with an adjustable focus and the reflected light beam is steered via the same beam splitter (14) and a further liquid lens (8) onto a detector (5) and analyzed,
   b) a fluorescence filter (19) for increasing the distance between the scattered light plane (31) and the fluorescence plane (30) is inserted into the convergent beam path between the liquid lens (8) and the detector (5) for the purpose of observing the fluorescence light,
   c) here, a particle tracing program or a heterodyne 180 degrees DLS program, an optics controller (15) and a display (2) with a touchscreen serve to control the measuring process.

6. The method as claimed in claim 5, wherein the viscosity of the sample (28) is ascertained with the aid of a temperature sensor (26).

7. The method as claimed in claim 5, wherein the sample vessel (27) contains electrodes (12) for electrophoresis and electrodes (13) for tapping a disturbance-free electric field in order to accurately determine the zeta potential.

* * * * *